United States Patent
White et al.

(10) Patent No.: US 10,379,985 B1
(45) Date of Patent: Aug. 13, 2019

(54) AUTOMATING AND MONITORING ROLLING CLUSTER REBOOTS

(71) Applicant: Dell Products L.P., Round Rock, TX (US)

(72) Inventors: William C. White, Round Rock, TX (US); Fook Choy Chan, Taman Sri Endah (MY)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

(21) Appl. No.: 15/886,518

(22) Filed: Feb. 1, 2018

(51) Int. Cl.
*G06F 11/30* (2006.01)
*G06F 11/14* (2006.01)
*G06F 9/50* (2006.01)
*G06F 21/57* (2013.01)

(52) U.S. Cl.
CPC ........ *G06F 11/3006* (2013.01); *G06F 9/5077* (2013.01); *G06F 11/1417* (2013.01); *G06F 11/3055* (2013.01); *G06F 21/575* (2013.01)

(58) Field of Classification Search
CPC ..... G06F 9/45558; H04L 67/34; H04L 67/42; H04L 29/12141; H04L 41/0233; H04L 41/0663; H04L 41/0843; H04L 41/0856; H04L 41/0893; H04L 41/5041; H04L 41/5058; H04L 61/1558; H04L 41/0672; H04L 63/08; H04L 63/102; H04L 67/1095; H04L 67/22; G06Q 10/10; G06Q 10/063112; G06Q 10/06314; G06Q 10/1093; G06Q 20/3829
See application file for complete search history.

(56) References Cited

U.S. PATENT DOCUMENTS

| | | | | |
|---|---|---|---|---|
| 7,243,142 B2* | 7/2007 | Poirot | ................... | H04L 41/044 709/220 |
| 7,698,390 B1* | 4/2010 | Harkness | ............ | G06F 11/1425 709/201 |
| 7,716,274 B1* | 5/2010 | Kumar | .................... | G06F 9/461 709/203 |
| 9,740,472 B1* | 8/2017 | Sohi | ......................... | G06F 8/65 |
| 9,979,791 B2* | 5/2018 | Aw | ................... | G08B 13/19656 |
| 2012/0117555 A1* | 5/2012 | Banerjee | .................. | G06F 8/65 717/168 |
| 2016/0212128 A1* | 7/2016 | Pike | ....................... | H04L 63/10 |
| 2016/0246717 A1* | 8/2016 | Patil | .................... | G06F 12/0806 |

(Continued)

*Primary Examiner* — Ninos Donabed
(74) *Attorney, Agent, or Firm* — Ryan, Mason & Lewis, LLP

(57) ABSTRACT

A method includes initiating a rolling cluster reboot for a cluster comprising a plurality of processing nodes and obtaining encoded state information specifying a plurality of states for transitioning a given processing node of the cluster from running as part of the cluster to rebooting and back to running as part of the cluster, and at least one timeout associated with a transition to a given one of the plurality of states. The method also includes monitoring transitioning of the given processing node between the plurality of states specified in the encoded state information, generating an alert responsive to determining that an elapsed time has exceed the at least one timeout specified in the encoded state information without the given processing node having transitioned to the given state, and providing the alert to a given client device coupled to the cluster via at least one network.

20 Claims, 11 Drawing Sheets

(56) References Cited

U.S. PATENT DOCUMENTS

2017/0085648 A1\* 3/2017 Aw .................. G08B 13/19656
2018/0173573 A1\* 6/2018 Navasivasakthivelsamy ..............
        H04L 9/32
2019/0034240 A1\* 1/2019 Nabi .................. H04L 41/5041

\* cited by examiner

| LIST OF STATES |
| --- |
| SCRIPT_STARTS |
| DUMMY_STATE |
| DB_PLUS_GRID_SHUTDOWN_BEGIN |
| DB_PLUS_GRID_SHUTDOWN_END; SERVER_REBOOT_BEGIN |
| SERVER_NON_PINGABLE |
| SERVER_REBOOT_END; GRID_PLUS_DP_STARTUP_BEGIN |
| GRID_PLUS_DB_STARTUP_END |
| EXIT_WITH_SUCCESS |
| EXIT_WITH_FAILURE |

501

| REPORTING SCRIPT COMMANDS |
| --- |
| report_state <NODE_NAME> |
| report_list_of_all_nodes_of_cluster |

| STARTING STATE | TRANSITION SCRIPT | SUCCESS END STATE | FAILURE END STATE | TRANSITION TIMEOUT (seconds) |
|---|---|---|---|---|
| SCRIPT_STARTS | kernel_staged | DB_PLUS_GRID_SHUTDOWN_BEGIN | DUMMY_STATE | 20 |
| DUMMY_STATE | poorly_bundled_apps | EXIT_WITH_SUCCESS | EXIT_WITH_FAILURE | 20 |
| DB_PLUS_GRID_SHUTDOWN_BEGIN | db_grid_shutdown | DB_PLUS_GRID_SHUTDOWN_END; SERVER_REBOOT_BEGIN | EXIT_WITH_FAILURE | 1200 |
| DB_PLUS_GRID_SHUTDOWN_END; SERVER_REBOOT_BEGIN | server_reboot | SERVER_NON_PINGABLE | EXIT_WITH_FAILURE | 300 |
| SERVER_NON_PINGABLE | NULL | SERVER_REBOOT_END; GRID_PLUS_DB_STARTUP_BEGIN | EXIT_WITH_FAILURE | 600 |
| SERVER_REBOOT_END; GRID_PLUS_DB_STARTUP_BEGIN | grid_db_startup | GRID_PLUS_DB_STARTUP_END | EXIT_WITH_FAILURE | 300 |
| GRID_PLUS_DB_STARTUP_END | NULL | EXIT_WITH_SUCCESS | NULL | 300 |

| LIST OF STATES |
| --- |
| DB_INSTANCE_SHUTDOWN_BEGIN |
| DB_INSTANCE_SHUTDOWN_END; NODE_LEAVE_CLUSTER_BEGIN |
| NODE_LEAVE_CLUSTER_END; VM_DESTROY_RECLONE_BEGIN |
| SERVER_NON_PINGABLE |
| VM_DESTOY_RECLONE_END; NODE_JOIN_CLUSTER_BEGIN |
| NODE_JOIN_CLUSTER_END; DB_STARTUP_BEGIN |
| EXIT_WITH_SUCCESS |
| EXIT_WITH_FAILURE |

801

| REPORTING SCRIPT COMMANDS |
| --- |
| report_state <NODE_NAME> |
| report_list_of_all_nodes_of_cluster |

| STARTING STATE | TRANSITION SCRIPT | SUCCESS END STATE | FAILURE END STATE | TRANSITION TIMEOUT (seconds) |
|---|---|---|---|---|
| DB_INSTANCE_SHUTDOWN_BEGIN | db_instance_shutdown | DB_INSTANCE_SHUTDOWN_END; NODE_LEAVE_CLUSTER_BEGIN | EXIT_WITH_FAILURE | 200 |
| DB_INSTANCE_SHUTDOWN_END; NODE_LEAVE_CLUSTER_BEGIN | leave_cluster | NODE_LEAVE_CLUSTER_END; VM_DESTROY_RECLONE_BEGIN | EXIT_WITH_FAILURE | 600 |
| NODE_LEAVE_CLUSTER_END; VM_DESTROY_RECLONE_BEGIN; | destroy_vm | SERVER_NON_PINGABLE | EXIT_WITH_FAILURE | 300 |
| SERVER_NON_PINGABLE | NULL | VM_DESTROY_RECLONE_END; NODE_JOIN_CLUSTER_BEGIN | EXIT_WITH_FAILURE | 600 |
| VM_DESTROY_RECLONE_END; NODE_JOIN_CLUSTER_BEGIN | join_cluster | NODE_JOIN_CLUSTER_END; DB_STARTUP_BEGIN | EXIT_WITH_FAILURE | 300 |
| NODE_JOIN_CLUSTER_END; DB_STARTUP_BEGIN | db_instance_startup | EXIT_WITH_SUCESS | EXIT_WITH_FAILURE | 300 |

AUTOMATING AND MONITORING ROLLING CLUSTER REBOOTS

FIELD

The field relates generally to information processing, and more particularly to managing clusters of processing nodes.

BACKGROUND

In information processing systems, it is generally desired to have as much uptime as possible. Users in many instances have come to expect essentially 100% uptime, which often cannot be guaranteed or provided using just a single server or machine. Various techniques may be used to provide increased uptime, such as the utilization of server clusters. Server clusters are advantageous in that there is no single point of failure, and high availability (HA) is provided. Maintenance of server clusters, however, is challenging.

SUMMARY

Illustrative embodiments of the present invention provide techniques for automated rolling cluster reboots. Such techniques in some embodiments advantageously permit maintenance of server clusters and other types of processing node clusters without affecting uptime.

In one embodiment, a method comprises initiating a rolling cluster reboot for a cluster comprising a plurality of processing nodes and obtaining encoded state information specifying a plurality of states for transitioning a given processing node of the cluster from running as part of the cluster to rebooting and back to running as part of the cluster, the encoded state information further specifying at least one timeout associated with a transition to a given one of the plurality of states. The method also comprises monitoring transitioning of the given processing node between the plurality of states specified in the encoded state information, generating an alert responsive to determining that an elapsed time has exceed the at least one timeout specified in the encoded state information without the given processing node having transitioned to the given state, and providing the alert to a given client device coupled to the cluster via at least one network. The method further comprises repeating the monitoring, generating and providing steps while one or more other processing nodes in the cluster transition, in a sequence, between the plurality of states specified in the encoded state information as part of the rolling cluster reboot. The method is performed by at least one processing device comprising a processor coupled to a memory.

These and other illustrative embodiments include, without limitation, methods, apparatus, networks, systems and processor-readable storage media.

BRIEF DESCRIPTION OF THE DRAWINGS

FIG. 5 shows lists of states and reporting scripts for encoding the FIG. 4 state diagram in an illustrative embodiment.

FIG. 6 shows an encoding of the FIG. 4 state diagram in an illustrative embodiment.

FIG. 8 shows lists of states and reporting scripts for encoding the FIG. 7 state diagram in an illustrative embodiment.

FIG. 9 shows an encoding of the FIG. 7 state diagram in an illustrative embodiment.

DETAILED DESCRIPTION

Figure 1:
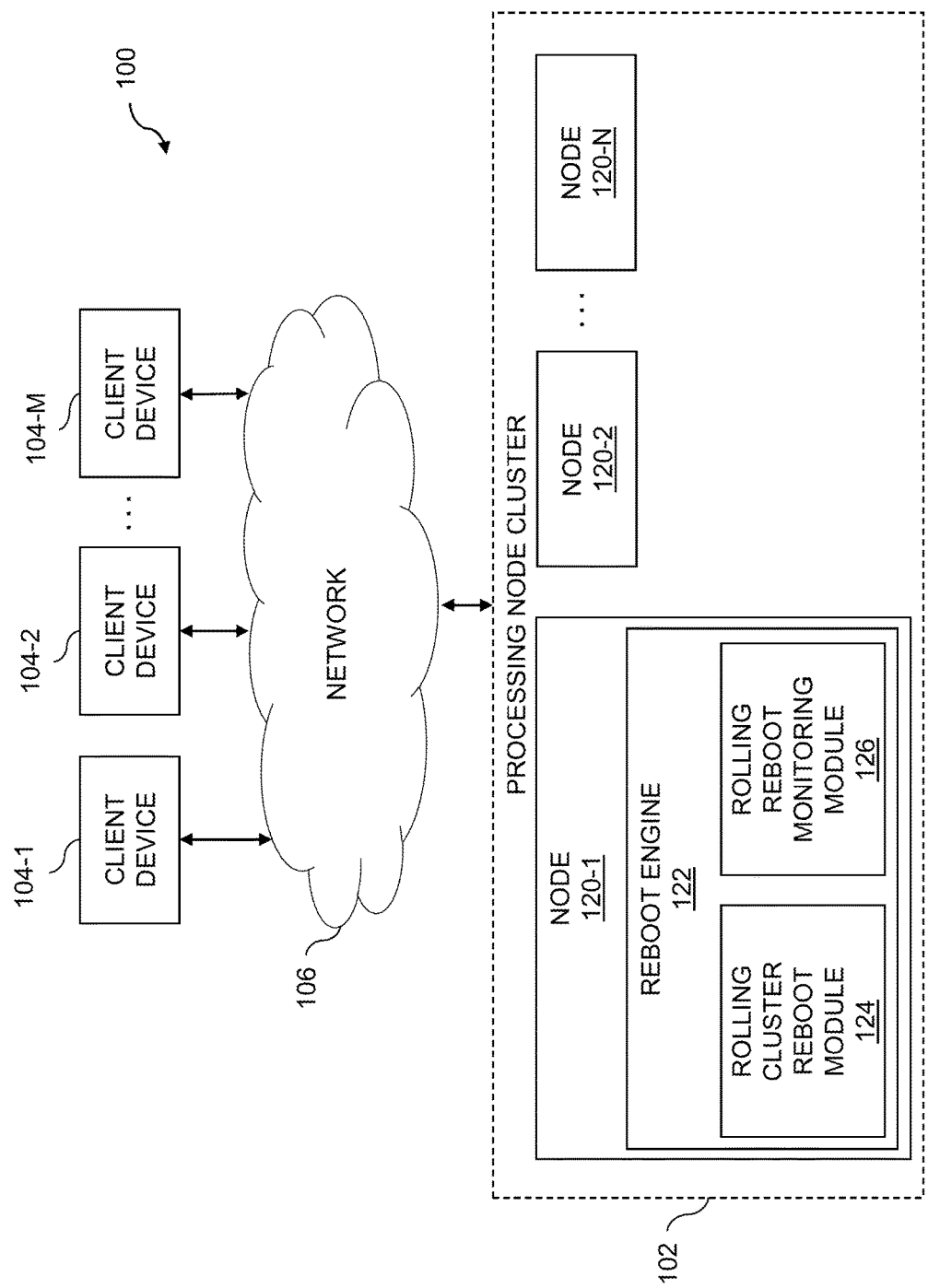
FIG. 1 is a block diagram of an information processing system for automating rolling cluster reboots in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As discussed above, there is a growing desire and push by customers or users for more uptime. Techniques for providing increased uptime include the utilization of server clusters, including HA server clusters with no single point of failure. Periodic maintenance of server clusters, however, presents various challenges. For example, to quarterly patch into new operating system (OS) kernels or application software versions such as new database (DB) versions, cluster reboots are required. To balance the need for maintenance of server clusters and the desire for uptime, system operators may perform what is referred to as a rolling cluster reboot. In a rolling cluster reboot, one node of a cluster is taken out of the cluster and one or more applications running thereon, such as one or more databases, are cleanly shut down. The node is rebooted, the applications and/or databases are restarted, and the node is rejoined to the cluster. The process for one node is repeated for all nodes in the cluster. The nodes in a cluster, as will be described in further detail below, may be physical servers, virtual machines, containers, etc. Well-written clients will re-connect to surviving nodes in a cluster while the nodes of the cluster are taken down in a sequence for maintenance. Thus, with a rolling cluster reboot, there is no application downtime and no business impact.

Rolling cluster reboots are advantageous in that they greatly reduce application unavailability. With poorly-written clients, only a few connections will be lost. With well-written clients, cluster reconnect is seamless to the application end users, and thus there is no business impact. Rolling cluster reboots, however, are manual processes with complex choreography. For example, a rolling cluster reboot starts with a first node of a cluster, where an application such as a database application shuts down a database and takes the first node out of the cluster. A system engineer then takes over, rebooting the server. The system engineer then turns the process back over to the database application, which starts back up the database instance on the rebooted server. The process then moves to the second node in the cluster. This manual process is thus repeated for each node in the cluster.

Embodiments provide techniques for automating rolling cluster reboots. The techniques described herein may be utilized with any type of cluster. A reboot engine is provided to implement automated rolling cluster reboots. The reboot engine in some embodiments is a script or utility that is loaded onto each node in a cluster to implement the automated rolling cluster reboot. The reboot engine is programmed with necessary details for implementing the automated rolling cluster reboot for a given cluster. Such details may include encoded state information for a plurality of states by which nodes of a cluster transition from fully up, to out of a cluster, to reboot, to fully back up and joined to the cluster. The details also include transition scripts by which nodes in the cluster can transition from state to state. The details further include timeout information, such as an overall timeout for a node in the rolling cluster reboot and/or per-transitions timeouts for the transitions between states. The reboot engine may be launched automatically using a scheduler, via an express user or system operator request invoking scripts of the reboot engine, etc.

FIG. 1 shows an information processing system 100 configured in accordance with an illustrative embodiment of the invention. The information processing system 100 comprises a processing node cluster 102, also referred to herein as cluster 102, comprising a plurality of nodes 120-1, 120-2, . . . 120-N (collectively, nodes 120). The nodes 120 of cluster 102 are coupled to a plurality of client devices 104-1, 104-2, . . . 104-M (collectively, client devices 104) via network 106.

The client devices 104 may comprise, for example, mobile telephones, laptop computers, tablet computers, desktop computers or other types of devices, in any combination. Such devices are examples of what are more generally referred to herein as "processing devices." Some of these processing devices are also generally referred to herein as "computers."

In some embodiments, the client devices 104 are devices utilized by members of an enterprise. For example, the client devices 104 may comprise respective computers associated with a particular company, organization or other enterprise. The nodes 120 of cluster 102 may provide one or more applications to the users of the client devices 104 on behalf of the enterprise. In other embodiments, different subsets of the client devices 104 may be used by members of different enterprises or other entities which access or otherwise utilize the one or more applications provided by nodes 120 of cluster 102.

As mentioned above, the nodes 120 of cluster 102 and client devices 104 are coupled or otherwise connected via network 106. The network 106, in some embodiments, is assumed to comprise a global computer network such as the Internet, although other types of networks may be used, including a wide area network (WAN), a local area network (LAN), a satellite network, a telephone or cable network, a cellular network, a wireless network such as a WiFi or WiMAX network, or various portions or combinations of these and other types of networks. The network 106 in some embodiments therefore comprises combinations of multiple different types of networks each comprising processing devices configured to communicate using Internet Protocol (IP) or other related communication protocols.

The cluster 102, as indicated above, includes a plurality of nodes 120. The nodes 120 may represent servers, virtual machines, containers, etc. Node 120-1 is shown including reboot engine 122 with a rolling cluster reboot module 124 and a rolling reboot monitoring module 126. Although not shown, it is assumed that other ones of the nodes 120 are similarly configured with reboot engines, rolling cluster reboot modules and rolling reboot monitoring modules.

The rolling cluster reboot module 124 of reboot engine 122 is configured to automate reboot of the node 120-1 during a rolling cluster reboot of the nodes 120 of cluster 102. The rolling cluster reboot module 124, for example, may be implemented as a script for automating the rolling cluster reboot. The script may utilize a state diagram and transition scripts or code snippets for transitioning between states in the state diagram to perform reboot of the node 120-1 in the automated rolling cluster reboot. The rolling reboot monitoring module 126 of reboot engine 122 is configured to allow the node 120-1 to monitor reboot of other nodes 120 in the cluster 102 during the rolling cluster reboot. The rolling reboot monitoring module 126, for example, may be implemented as a script which monitors the status of the other nodes 120 of cluster 102, to determine whether any transition in state by the other nodes 120 has exceed an associated per-transition timeout, or to determine whether an overall timeout is exceeded for reboot of a given node in the automated rolling cluster reboot.

If one of the nodes 120 in the cluster 102 detects that the overall timeout (or one of the per-transition timeouts) is exceeded, the rolling reboot monitoring module 126 generates an alert or notification for delivery to one or more of the client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the nodes 120 of the cluster 102. For example, a given security or host agent may comprise a mobile telephone equipped with a mobile application configured to receive alerts from the rolling reboot monitoring module 126 (more generally, from reboot engine 122 or one or more of the nodes 120) and to provide an interface for the security agent to select particular remedial measures for responding to the alert or notification. Examples of such remedial measures may include pausing or stopping the rolling cluster reboot, deploying authorized service personnel or resources to determine a status of the failed node (e.g., the node that has exceed the overall or per-transition timeout for its reboot), allocating additional compute, storage and/or networking resources to establish a new node for the cluster 102 to replace the failed node, reverting the failed node from a last reported state to a previous state, transitioning the failed node from the last reported state to a next state, transitioning the failed node to a success state, etc.

It should be noted that a "security agent" or "host agent" as these terms are generally used herein may comprise an automated entity, such as a software entity running on a processing device. Accordingly, a security agent or host agent need not be a human entity.

An automated rolling cluster reboot may be initiated by the reboot engine 120 based on a scheduler running on the node 102-1. Alternatively or additionally, a rolling cluster reboot may be initiated by authorized users (e.g., system administrators, IT personnel, etc.) utilizing one or more of the client devices 104. The reboot engine 120 may be programmed with reboot scripts, transition scripts, timeout parameters, etc. by such authorized users via the client devices 104. Alternatively or additionally, the reboot engine 120 may be configured to obtain such information from a knowledge database (not shown in FIG. 1).

Although not explicitly shown in FIG. 1, one or more input-output devices such as keyboards, displays or other types of input-output devices may be used to support one or more user interfaces to the nodes 120 of cluster 102 and to client devices 104, as well as to support communication between such elements and other related systems and devices not explicitly shown.

Additional details regarding the reboot engine 122 of node 120-1, and more generally automated rolling cluster reboots of the nodes 120 of cluster 102, will be described in further detail below with respect to FIGS. 2-9.

It is to be appreciated that the particular arrangement of the cluster 102, nodes 120 and client devices 104 in the FIG. 1 embodiment is presented by way of example only, and alternative arrangements can be used in other embodiments. For example, one or more of the nodes 120 may be part of multiple clusters, the nodes 120 of cluster 102 may be geographically dispersed and coupled via network 106, etc. As another example, functionality associated with the rolling cluster reboot module 124 and rolling reboot monitoring module 126 may be combined into one module, or separated across more than two modules with the multiple modules possibly being implemented with multiple distinct processors.

At least portions of the reboot engine 122, rolling cluster reboot module 124 and rolling reboot monitoring module 126 may be implemented at least in part in the form of software that is stored in memory and executed by a processor.

It is to be understood that the particular set of elements shown in FIG. 1 for automated rolling cluster reboots is presented by way of illustrative example only, and in other embodiments additional or alternative elements may be used. Thus, another embodiment may include additional or alternative systems, devices and other network entities, as well as different arrangements of modules and other components.

The nodes 120 of cluster 102 and/or the client devices 104 may be implemented at least in part using one or more processing platforms. Examples of such processing platforms will be described in further detail below with respect to FIGS. 10 and 11.

Figure 2:
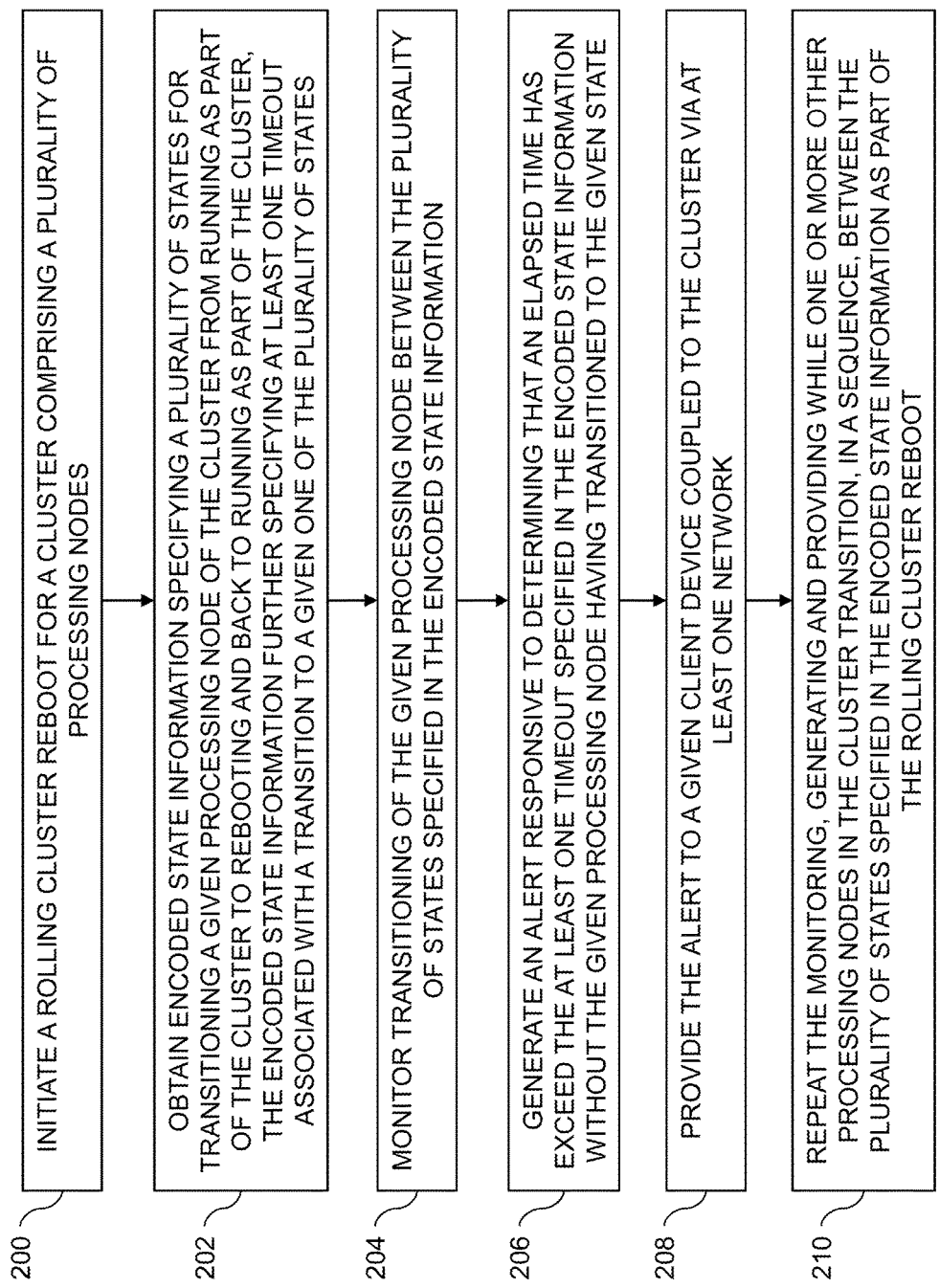
FIG. 2 is a flow diagram of an exemplary process for automating rolling cluster reboots in an illustrative embodiment.

An exemplary process for automated rolling cluster reboots will now be described in more detail with reference to the flow diagram of FIG. 2. It is to be understood that this particular process is only an example, and that additional or alternative processes for automating rolling cluster reboots can be carried out in other embodiments.

In this embodiment, the process includes steps 200 through 210. These steps are assumed to be performed by a processor of one or more of the nodes 120 of cluster 102 utilizing reboot engine 122. The process begins with step 200, initiating a rolling cluster reboot for a cluster comprising a plurality of processing nodes. The rolling cluster reboot may be initiated by a given client device, on a schedule, etc.

In step 202, encoded state information is obtained. The encoded state information specifies a plurality of states for transitioning a given processing node of the cluster from running as part of the cluster to rebooting and back to running as part of the cluster. The encoded state information also specifies at least one timeout associated with a transition to a given one of the plurality of states. The at least one timeout may comprise an overall timeout for the given processing node to complete transitioning to an exit with success state in the plurality of states. The at least one timeout may further or alternatively include at least one per-transition timeout for the given processing node to complete transitioning from a first state to a second state in the plurality of states. The encoded state information may comprise a plurality of entries each specifying: a starting state; a transition script for executing a transition from the starting state to a success end state; a transition timeout; the success end state; and a failure end state entered responsive to failure to transition to the success end state within the transition timeout.

Step 202 may further include determining an ordering for rebooting the processing nodes of the cluster by sorting the processing nodes of the cluster lexically by hostname. The sequence for rebooting the processing nodes in the rolling cluster reboot is based on the determined ordering. The process continues with step 204, monitoring transitioning of the given processing node between the plurality of states specified in the encoded state information. In step 206, an alert is generated responsive to determining that an elapsed time has exceed the at least one timeout specified in the encoded state information without the given processing node having transitioned to the given state. The alert is provided to a given client device coupled to the cluster via at least one network in step 208. Step 210 is repeating steps 204, 206 and 208 while one or more other processing nodes in the cluster transition, in a sequence, between the plurality of states specified in the encoded state information as part of the rolling cluster reboot.

Step 204 may be performed by one or more other processing nodes in the cluster. The one or more other processing nodes in the cluster may periodically request the given processing node to report a current state of the plurality of states. Step 206 may thus be responsive to the one or more other processing nodes determining that an elapsed time for the current state of the plurality of states exceeds the at least one timeout.

The alert generated in step 206 may comprise an identifier of a hostname for the given processing node and a last reported state of the given processing node. Providing the alert in step 208 may initiate remedial action, such as action to transition the given processing node from the last reported state to a next state of the plurality of states in the encoded state information, action to transition the given processing node to an exit with success state of the plurality of states in the encoded state information, and/or action to revert the given processing node to a state previous to the last reported state.

In some embodiments, the cluster comprises a database cluster, where each of the plurality of processing nodes of the cluster comprises a physical server that hosts an instance of a database application and cluster software. In such embodiments, the plurality of states specified in the encoded state information may comprise: a cluster software shutdown state wherein a given instance of the database application running on the given processing node is shut down and the cluster software running on the given processing node is shut down; a server reboot state wherein the physical server hosting the given processing node is rebooted; a server non-pingable state wherein the physical server hosting the given processing node is unavailable while rebooting; a cluster software startup state wherein the physical server hosting the given processing node is rebooted and the physical server starts up the cluster software and the instance of the database application; an exit with failure state wherein the given processing node has failed to complete one or more of the cluster software shutdown state, the server reboot state, the server non-pingable state and the cluster software startup state; and an exit with success state wherein the given processing node has successfully completed the cluster software startup state.

In other embodiments, the cluster comprises a database cluster and each of the plurality of processing nodes comprises a virtual machine hosting an instance of a database application and cluster software. In such embodiments, the plurality of states specified in the encoded state information may comprise: a database instance shutdown state wherein a given instance of the database application running on the given processing node is shut down; a leave cluster state wherein the given processing node leaves the cluster; a redone state wherein a given virtual machine hosting the given processing node is destroyed and the given node is re-created with a new virtual machine having a same name as the given virtual machine; a server non-pingable state wherein the given processing node is unavailable while the given virtual machine is destroyed and the new virtual machine is created; a join cluster state wherein the new virtual machine hosting the given processing node joins the cluster; a database instance startup state wherein the given instance of the database application is started on the new virtual machine hosting the given processing node; an exit with failure state wherein the given processing node has failed to complete one or more of the database instance shutdown state, the leave cluster state, the redone state, the server non-pingable state, the join cluster state, and the database instance startup state; and an exit with success state wherein the given processing node has successfully completed the database instance startup state.

In still other embodiments, the cluster may comprise a storage system cluster such as a network file system (NFS) cluster. The techniques described herein for automating rolling cluster reboots may be applied to various other types of storage system and other clusters.

In some embodiments, algorithms for automating rolling cluster reboots use an overall approach, wherein during reboot of a first node in a cluster the other nodes wait a full amount of time that the reboot is expected to take (e.g., an overall timeout). If the first node fully comes back up within the overall timeout, the reboot of that node is considered successful and processing proceeds to a next node in the cluster. The automated rolling cluster reboot continues until a node fails to fully come back up in a desired state within the overall timeout, or all nodes are successfully rebooted in a rolling fashion. If a node fails to fully come back up in the desired state within the overall timeout, other nodes in the cluster may generate alerts or notifications for delivery to security agents in the manner described above, to initiate remedial action.

In other embodiments, algorithms for automating rolling cluster reboots use one or more per-transition timeouts, in addition to or in place of an overall timeout. Embodiments which utilize per-transition timeouts require the nodes in the cluster to have knowledge of the internal state information of the node that is rebooting. The nodes interrogate the node that is currently transitioning between states for timely transitions from state to state. By utilizing per-transition timeouts, it is possible to identify problems or failure quicker.

Regardless of whether an overall timeout or per-transition timeouts are used, embodiments may proceed by sorting the nodes of a cluster. For example, the nodes of a cluster may be sorted lexically by hostname (e.g., Node 1, Node 2, Node 3, etc.). The nodes of the cluster proceed in that order. For example, Node 1 starts the reboot process, while other nodes wait for Node 1 to complete. Node 2 starts after successful reboot of Node 1. If the reboot of Node 1 fails, Node 2 will not start the reboot process.

Rolling cluster reboots provide various advantages. For example, organizations or entities which operate database clusters and other types of clusters often due maintenance or servicing periodically (e.g., every month, every 3 months, every 6 months, etc.), as the reboot of such clusters is a difficult manual process. Such difficulties are exacerbated by scale as well. An entity may have thousands of database servers arranged in hundreds of database clusters, and thus manually rebooting the database clusters can be an extremely labor-intensive process. This often requires the entity to resort to scheduled downtime, which affects uptime and is not desired.

While kernel splicing may be used to avoid rebooting database clusters or other types of clusters, kernel splicing presents its own challenges. Kernel splicing may be used to apply patches to a kernel such as the Linux kernel without rebooting. However, depending on how the database or other applications or utilities on nodes are configured, failures may occur due to such utilities expecting to see the old kernel version.

Examples of state diagrams and transition scripts for performing rolling cluster reboots of database systems will now be described in detail with respect to FIGS. 3-9. It is to be appreciated, however, that rolling cluster reboots are not limited to being performed for database clusters. The techniques described herein for automating rolling cluster reboots may be used for various other types of clusters, including but not limited to clusters of storage systems, such as high-availability NFS clusters.

Figure 3:
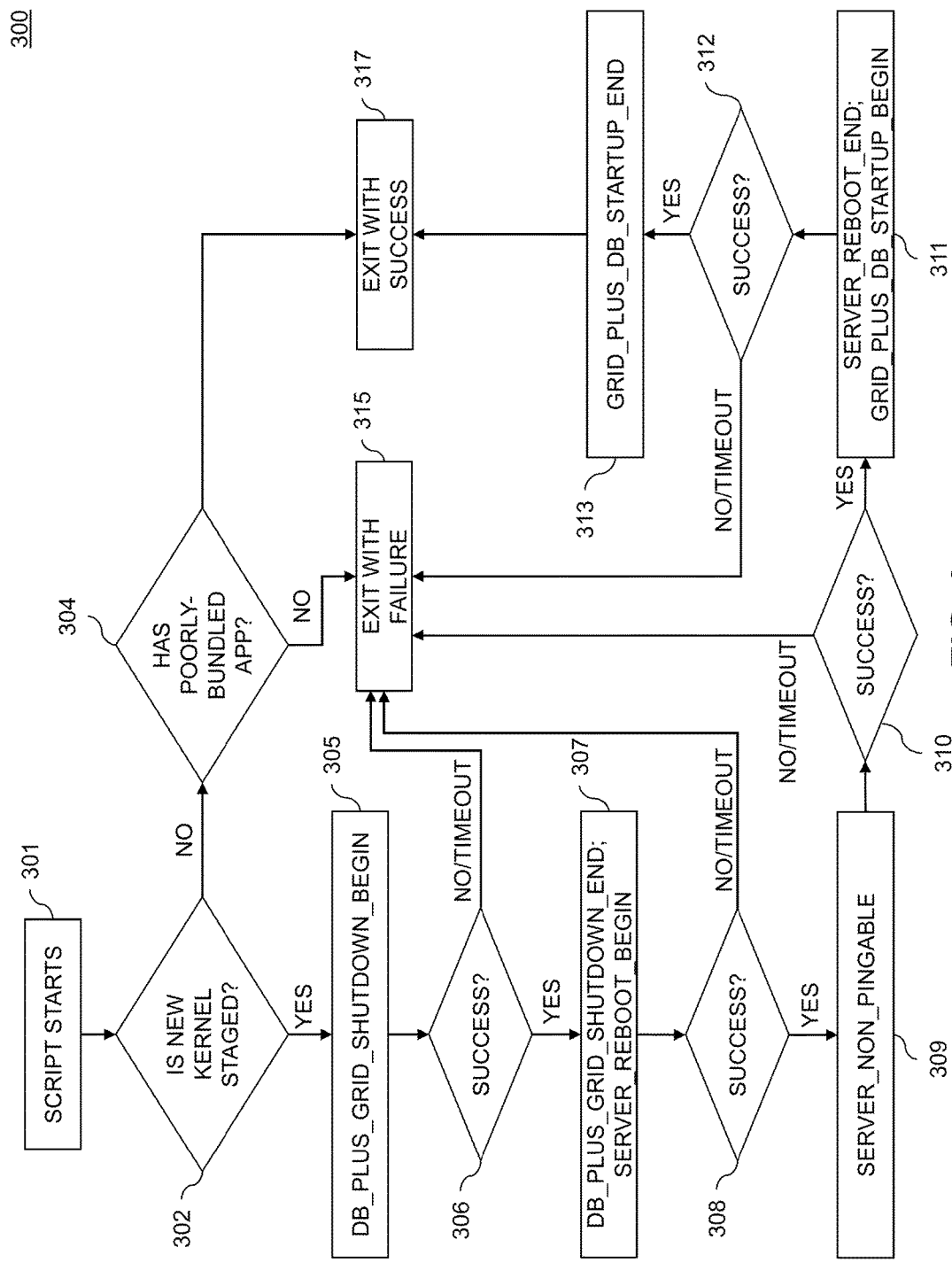
FIG. 3 is a state diagram for a database rolling cluster reboot in an illustrative embodiment.

FIG. 3 shows an example state transition diagram 300 for performing a rolling cluster reboot of an Oracle® database cluster. In the state transition diagram 300, rectangular elements denote states.

The state transition diagram 300 begins with state 301 where the script to initiate the rolling cluster reboot on a given node in the database cluster starts. After state 301, the process transitions to decision block 302, determining if a new kernel has been staged for the given node in the database cluster. If a new kernel is not staged (e.g., in the boot filesystem), then the given node will not be updated and the reboot process generally should not continue. Thus, the state diagram transitions to decision block 304, where it is determined if the database application is "poorly-bundled." Certain types of database applications may embed kernel modules. In such instances, the Linux kernel looks for a directory tree to find the new kernel or third party kernel modules. For such poorly-bundled applications, not having a new kernel staged is expected behavior. Thus, poorly-bundled applications result in a transition to state 317, exit with success. If the database application is not poorly-bundled, the result is a transition to state 315, exit with failure. As will be described in further detail below, the state transition diagram 300 is altered prior to encoding, to introduce a dummy or fake state between decision blocks 302 and 304 for smooth operation.

If the decision block 302 determines that the new kernel is staged, the result is a transition to state 305, DB_PLUS_GRID_SHUTDOWN_BEGIN, where the database cluster software is shut down on the given node. The state 305 may include shutting down the database instance that is running on the given node, followed by shutting down the cluster software on the given node. In decision block 306, it is determined whether the given node has successfully transitioned from state 305 to state 307. This is determined by other nodes in the cluster querying the given node, to determine a current state of the given node. A per-transition timeout is assigned to the transition between state 305 and state 307. If this timeout is exceeded without the given node having transitioned to state 307, the result is a transition to state 315, exit with failure.

State 307 is DB_PLUS_GRID_SHUTDOWN_END; SERVER_REBOOT_BEGIN, where the database instance and cluster software are successfully shut down and the given node or server hosting that node is rebooted. In decision block 308, it is determined whether the given node has successfully transitioned from state 307 to state 309. The decision block 308, similar to decision block 306, has a per-transition timeout associated therewith. If this timeout is exceeded without the given node having transitioned to state 309, the result is a transition to state 315, exit with failure.

State 309 is SERVER_NON-PINGABLE, where the given node or server hosting the given node is rebooting. During reboot, the given node cannot be successfully pinged, thus indicating that the rolling cluster reboot of the given node is proceeding as desired. In decision block 310, it is determined whether the given node has successfully transitioned from state 309 to state 311. The decision block 310, similar to decision blocks 306 and 308, has a per-transition timeout associated therewith. If this timeout is exceeded without the given node having transitioned to state 311, the result is a transition to state 315, exit with failure.

State 311 is SERVER_REBOOT_END; GRID_PLUS_DB_STARTUP_BEGIN, where the server hosting the given node is back up following the reboot, and the cluster software and database instance for the given node are started. If the transition to state 311 takes too long (e.g., the node or server is non-pingable for a time period exceeding the per-transition timeout of decision block 310), this indicates that the server hosting the given node was not successfully restarted. In decision block 312, it is determined whether the given node has successfully transitioned from state 311 to state 313. The decision block 312, similar to decision blocks 306, 308 and 310, has a per-transition timeout associated therewith. If this timeout is exceeded without the given node having transitioned to state 313, the result is a transition to state 315, exit with failure.

State 313 is GRID_PLUS_DB_STARTUP_END, where the cluster software and database instance are successfully running on the given node. State 313 transitions to state 317, exit with success.

Figure 4:
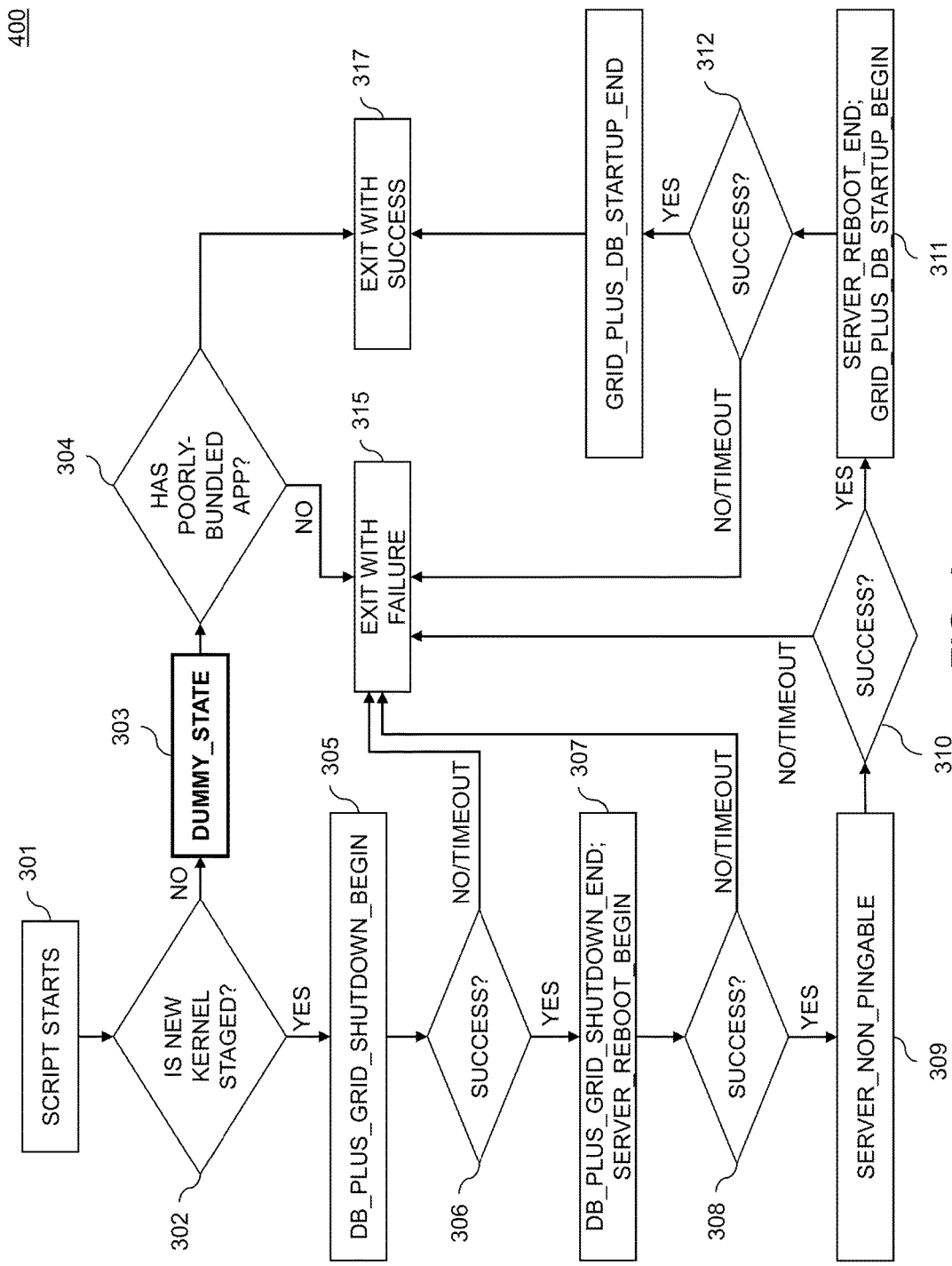
FIG. 4 is a version of the FIG. 3 state diagram suitable for encoding in an illustrative embodiment.

FIG. 4 shows a state diagram 400 that is similar to state diagram 300, but with the addition of the fake or dummy state 303 between decision blocks 302 and 304, such that the state diagram 400 is suitable for encoding. A state diagram that is suitable for encoding has a format of (Previous State→Decision Block→Next State).

FIG. 5 shows a listing of states 501 and reporting script functions 503 for encoding the state diagram 400. The list of states 501 includes states 301, 303, 305, 307, 309, 311, 313, 315 and 317 described above. The reporting script function 503 includes a first function report_state which takes as input the parameter NODE_NAME. The report_state function is used by nodes in a cluster to query other nodes for the current state. For example, during a rolling cluster reboot, while a first node, Node 1, is being rebooted, the other nodes in that cluster may periodically invoke the function report_state Node 1 to determine the current state of Node 1. The other nodes keep track of the times at which Node 1 reports being in each state, and can thus use the per-transition timeouts to determine if an error has occurred.

Assume, for example, that Node 1 is in state 305 at time t1, as reported to the other nodes in the cluster using the report_state function. If, at a time t2 the Node 1 is still in state 305, where t2−t1 exceeds the per-transition timeout for the transition between state 305 and state 307, the result is a transition to the exit with failure state 315. When state 315 is reached, an alert is generated as described above. If, at time t2 the Node 1 is in state 307, this indicates that the process is continuing as expected. The other nodes update their respective records for the current state of Node 1, and continue monitoring for the subsequent transition to state 309 by additional invocation of the report_state function. It is to be appreciated that, in some embodiments, per-transition timeouts are not utilized and instead an overall timeout is used. In such an instance, the other nodes in the cluster use report_state in the same manner, but alerts are not generated until the overall timeout is expired and Node 1 is not in state 315 of exit with success.

The report_state command or function may be invoked periodically (e.g., every minute or some other designated time period), or on a determination that a node being rebooted should have transitioned to another state (e.g., on a determination that a current per-transition timeout is expired, or on a determination that an overall timeout is expired).

The reporting script functions 503 further include the command or function report_list_of_all_nodes_of cluster, which may be invoked by any node in a cluster to return the states of all nodes in the cluster. FIG. 6 shows an encoding 600 of the state diagram 400, also referred to herein as encoded state information, showing a starting state, the transition script or code snippet which is executed during each state, the success and failure end states, and the per-transition timeouts.

For embodiments wherein an overall timeout is utilized, the overall timeout may be the sum of the per-transition timeouts shown in encoding 600. The nodes in the cluster will utilize the report_state command or function to check the status of the node in the cluster that is currently being rebooted (e.g., every minute or other designated time period, after expiration of the overall timeout, etc.). After waiting the cumulative period of time that is the sum of the per-transition timeouts, the nodes check whether the node being rebooted comes back within the overall timeout in the desired state. If the node being rebooted is in the exit with failure state 315, or is in a state other than the exit with success state 317 at the end of the timeout, this indicates that there is a problem and an alert is generated as described herein.

Figure 7:
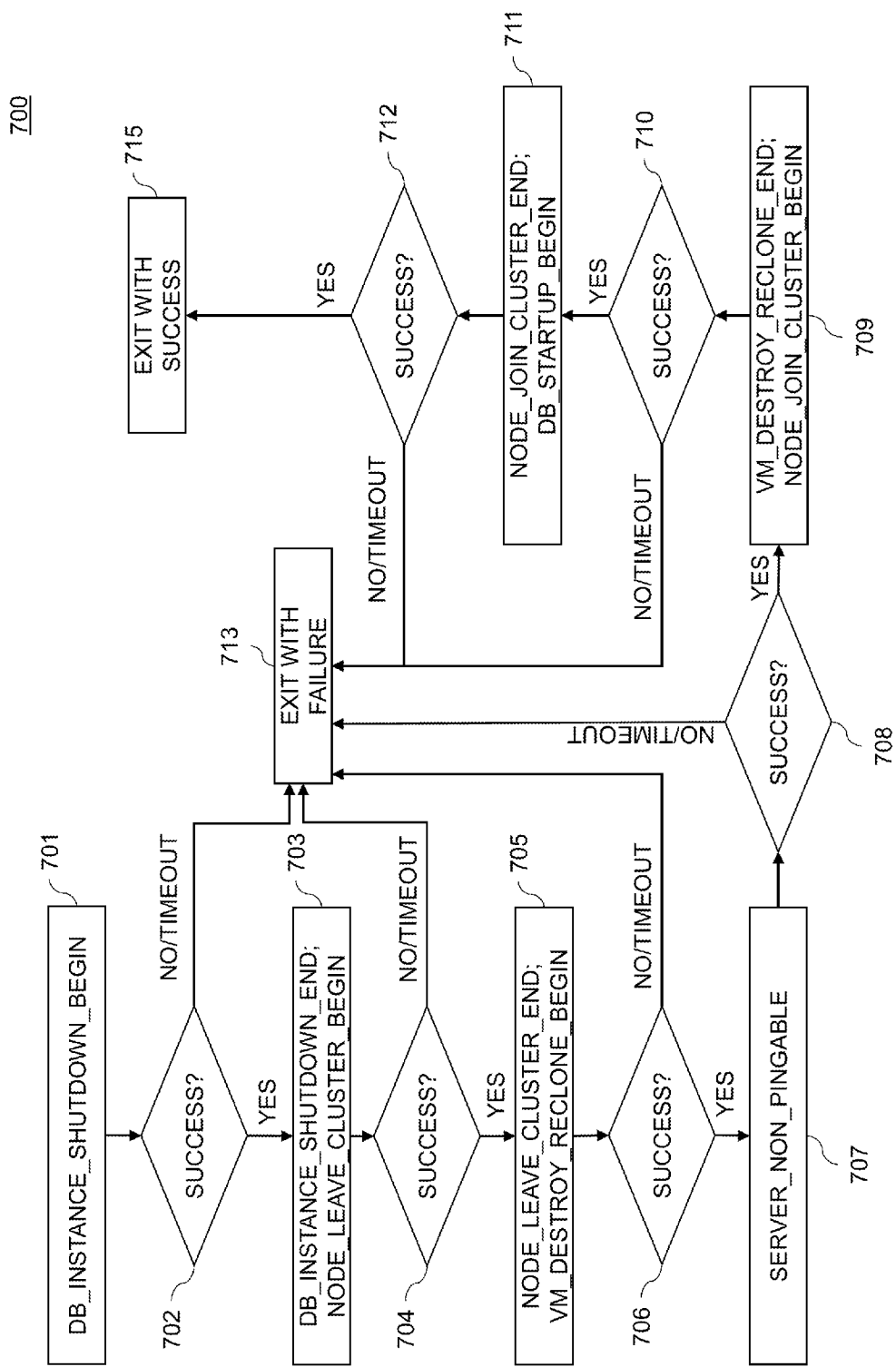
FIG. 7 is another state diagram for a rolling database cluster reboot in an illustrative embodiment.

FIG. 7 shows another state diagram 700 for a rolling cluster reboot for a database cluster. Whereas the state diagrams 300 and 400 are described with respect to an Oracle® database cluster, the state diagram 700 is associated with a Cassandra® database cluster. In a Cassandra® database cluster, the nodes are implemented as virtual machines. Once a node is taken out of the cluster, the virtual machine implementing that node is destroyed and recreated from a newly-patched template. The new clone is started up and added back into the cluster to replace the destroyed virtual machine.

The state diagram 700 beings in state 701, DB_INSTANCE_SHUTDOWN_BEGIN, where the database software on a given node in the cluster is shut down. In decision block 702, it is determined whether the given node has successfully transitioned from state 701 to state 703. The decision block 702 has a per-transition timeout associated therewith. If this timeout is exceeded without the given node having transitioned to state 703, the result is a transition to state 713, exit with failure.

State 703 is DB_INSTANCE_SHUTDOWN_END; NODE_LEAVE_CLUSTER_BEGIN where the database software is successfully shut down on the given node, and the given node is taken out of the database cluster. In decision block 704, it is determined whether the given node has successfully transitioned from state 703 to state 705. The decision block 704, similar to the decision block 702, has a per-transition timeout associated therewith. If this timeout is exceeded without the given node having transitioned to state 705, the result is a transition to state 713, exit with failure.

State 705 is NODE_LEAVE_CLUSTER_END; VM_DESTROY_RECLONE_BEGIN, where the virtual machine hosting the given node is destroyed and a new virtual machine with the same name is re-created, but patched or otherwise updated as desired. In decision block 706, it is determined whether the given node has successfully transitioned from state 705 to state 707. The decision block 706, similar to the decision blocks 702 and 704, has a per-transition timeout associated therewith. If this timeout is exceeded without the given node having transitioned to state 707, the result is a transition to state 713, exit with failure.

State 707 is SERVER_NON_PINGABLE, similar to state 309 in the state diagrams 300 and 400. After the virtual machine hosting the given node is destroyed, and while the new virtual machine is created, there is a period of time where the given node cannot be pinged successfully which represents expected behavior. In decision block 708, it is determined whether the given node has successfully transitioned from state 707 to state 709. The decision block 708, similar to the decision blocks 702, 704 and 706, has a per-transition timeout associated therewith. If this timeout is exceeded without the given node having transitioned to state 709, the result is a transition to state 713, exit with failure.

State 709 is VM_DESTROY_RECLONE_END; NODE_JOIN_CLUSTER_BEGIN, where the new virtual machine has successfully been recreated with the same name as the previous virtual machine hosting the given node. The given node then rejoins the cluster. In decision block 710, it is determined whether the given node has successfully transitioned from state 709 to state 711. The decision block 710, similar to the decision blocks 702, 704, 706 and 708, has a per-transition timeout associated therewith. If this timeout is exceeded without the given node having transitioned to state 711, the result is a transition to state 713, exit with failure.

State 711 is NODE_JOIN_CLUSTER_END; DB_STARTUP_BEGIN, where the given node has successfully joined the cluster and the database instance is started. In decision block 712, it is determined whether the given node has successfully transitioned from state 711 to state 715, exit with success. The decision block 712, similar to the decision blocks 702, 704, 706, 708 and 710, has a per-transition timeout associated therewith. If this timeout is exceeded without the given node having transitioned to state 715, the result is a transition to state 713, exit with failure.

FIG. 8 shows a listing of states 801 and reporting script functions 803 for encoding the state diagram 700. The list of states 801 includes states 701, 703, 705, 707, 709, 711, 713 and 715. The reporting script functions 803 are similar to the reporting script functions 503 described above. FIG. 9 shows an encoding 900 of the state diagram 700. Similar to the encoding 600, the encoding 900 shows a starting state, transition script or code snippet which is executed during each state, the success and failure end state, and the per-transition timeouts. Also similar to the encoding 600, for embodiments wherein the overall timeout is utilized the overall timeout may be the sum of the per-transition timeouts in encoding 900.

Again, it should be noted that the techniques described herein for automating rolling cluster reboots is not limited to use with database clusters, but instead may be more generally used in any type of cluster where rolling cluster reboots are performed.

Embodiments provide various advantages relative to conventional techniques such as manual performance of a rolling cluster reboot. For example, the techniques described herein permit automation of this task utilizing sets of rules defined by the use of encoded state information. In addition, the techniques for automating rolling cluster reboots described herein can be used to improve performance by speeding up the rolling cluster reboot process. Additional advantages include reduced downtime and reduced time in which individual nodes in the cluster are being rebooted, as there is no waiting on manual action to perform next steps in the process for performing the rolling cluster reboot within a given node and there is reduced time between when a first node is successfully rebooted and the reboot process for a subsequent node begins.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the nodes 120 of cluster 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
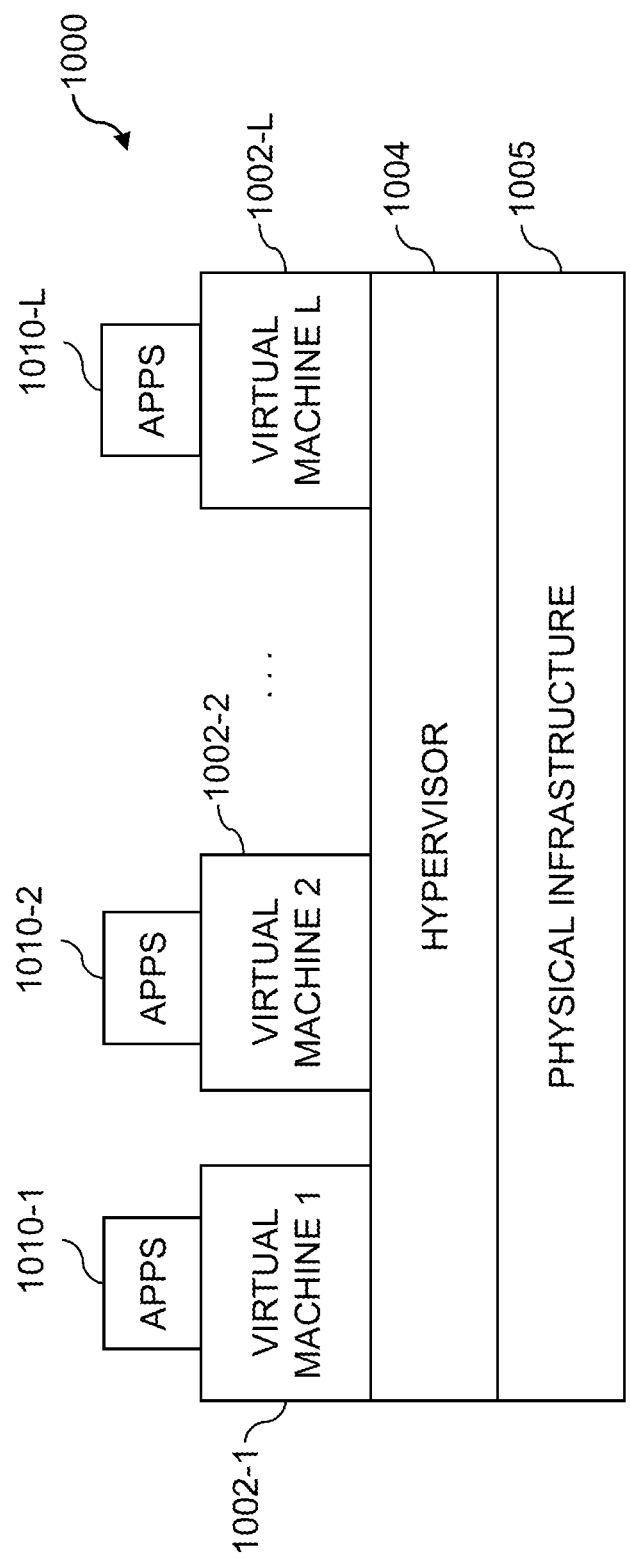
FIGS. 10 and 11 show examples of processing platforms that may be utilized to implement at least a portion of an information processing system in illustrative embodiments.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises virtual machines (VMs) 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

Although only a single hypervisor 1004 is shown in the embodiment of FIG. 10, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1004 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Figure 11:
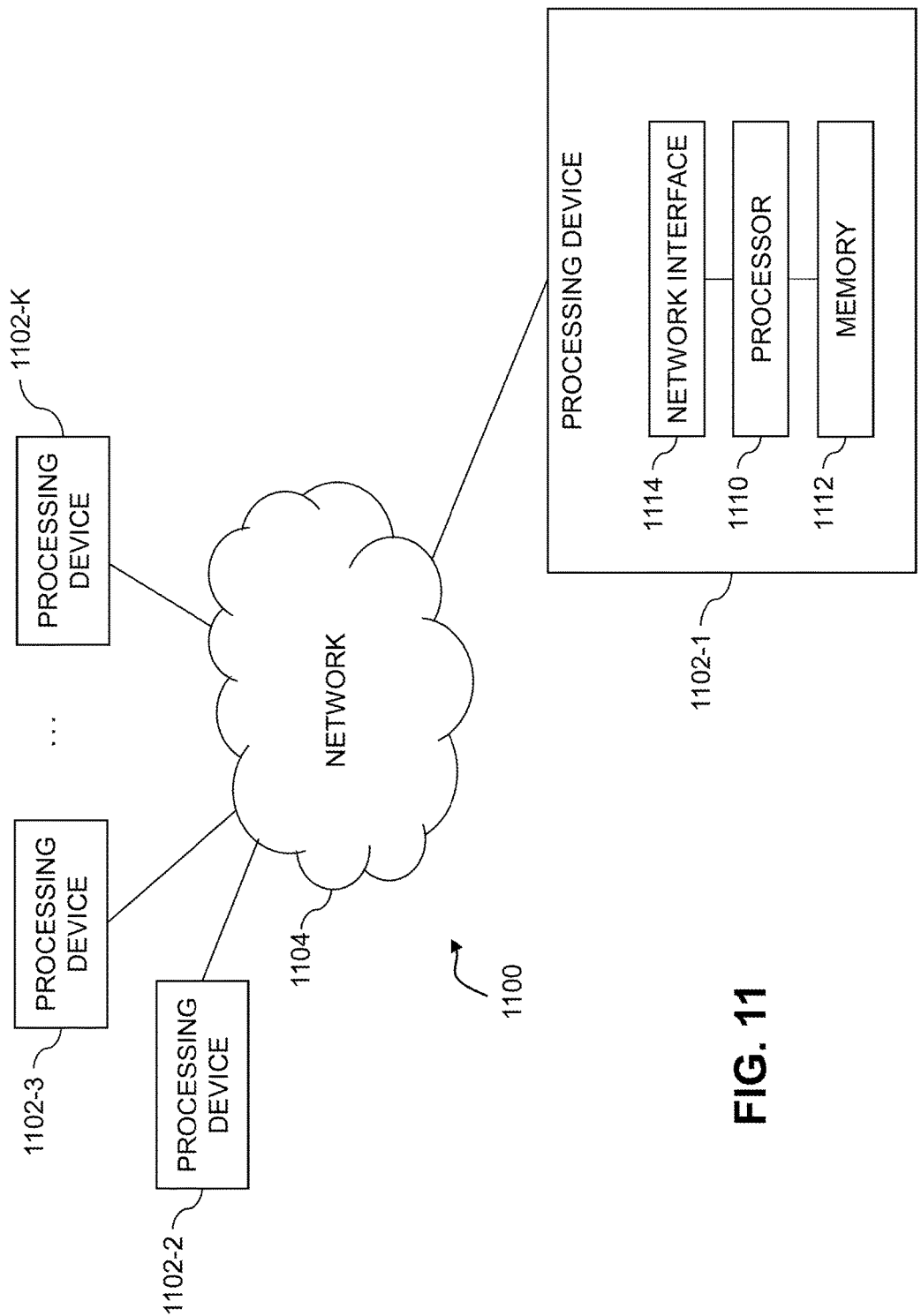

Again, the particular processing platform 1100 shown in FIG. 11 is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of information processing systems and processing device configurations. Also, different types and arrangements of clusters, applications, states, transitions, scripts, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
    initiating a rolling cluster reboot for a cluster comprising a plurality of processing nodes;
    obtaining encoded state information specifying a plurality of states for transitioning a given processing node of the cluster from running as part of the cluster to rebooting and back to running as part of the cluster, the encoded state information further specifying at least one timeout associated with a transition to a given one of the plurality of states;
    monitoring transitioning of the given processing node between the plurality of states specified in the encoded state information;
    generating an alert responsive to determining that an elapsed time has exceed the at least one timeout specified in the encoded state information without the given processing node having transitioned to the given state;
    providing the alert to a given client device coupled to the cluster via at least one network; and
    repeating the monitoring, generating and providing steps while one or more other processing nodes in the cluster transition, in a sequence, between the plurality of states specified in the encoded state information as part of the rolling cluster reboot;
    wherein monitoring the transitioning of the given processing node between the plurality of states specified in the encoded state information is performed by at least one other processing node in the cluster;
    wherein the at least one other processing node in the cluster periodically requests the given processing node to report a current state of the plurality of states;
    wherein generating the alert is responsive to the at least one other processing node determining that an elapsed time for the current state of the plurality of states exceeds the at least one timeout; and
    wherein the method is performed by at least one processing device comprising a processor coupled to a memory.

2. The method of claim 1 wherein the at least one timeout comprises an overall timeout for the given processing node to complete transitioning to an exit with success state in the plurality of states.

3. The method of claim 1 wherein the at least one timeout comprises at least one per-transition timeout for the given processing node to complete transitioning from a first state to a second state in the plurality of states.

4. The method of claim 1 further comprising determining an ordering for rebooting the processing nodes of the cluster by sorting the processing nodes of the cluster lexically by hostname, and wherein the sequence for rebooting the processing nodes in the rolling cluster reboot is based on the determined ordering.

5. The method of claim 1 wherein the encoded state information comprises a plurality of entries each specifying:
    a starting state;
    a transition script for executing a transition from the starting state to a success end state;
    a transition timeout;
    the success end state; and
    a failure end state entered responsive to failure to transition to the success end state within the transition timeout.

6. The method of claim 1 wherein the alert comprises an identifier of a hostname for the given processing node and a last reported state of the given processing node, and wherein providing the alert to the given client device initiates remedial action to at least one of:
    transition the given processing node from the last reported state to a next state of the plurality of states specified in the encoded state information;
    transition the given processing node to an exit with success state of the plurality of states specified in the encoded state information; and
    revert the given processing node to a state previous to the last reported state.

7. The method of claim 1 wherein the cluster comprises a database cluster and each of the plurality of processing nodes comprises a physical server hosting an instance of a database application and cluster software.

8. The method of claim 7 wherein the plurality of states specified in the encoded state information comprise:
    a cluster software shutdown state wherein a given instance of the database application running on the given processing node is shut down and the cluster software running on the given processing node is shut down;
    a server reboot state wherein the physical server hosting the given processing node is rebooted;
    a server non-pingable state wherein the physical server hosting the given processing node is unavailable while rebooting;
    a cluster software startup state wherein the physical server hosting the given processing node is rebooted and the physical server starts up the cluster software and the instance of the database application;
an exit with failure state wherein the given processing node has failed to complete one or more of the cluster software shutdown state, the server reboot state, the server non-pingable state and the cluster software startup state; and
an exit with success state wherein the given processing node has successfully completed the cluster software startup state.

9. The method of claim 1 wherein the cluster comprises a database cluster and each of the plurality of processing nodes comprises a virtual machine hosting an instance of a database application and cluster software.

10. The method of claim 9 wherein the plurality of states specified in the encoded state information comprise:
a database instance shutdown state wherein a given instance of the database application running on the given processing node is shut down;
a leave cluster state wherein the given processing node leaves the cluster;
a reclone state wherein a given virtual machine hosting the given processing node is destroyed and the given processing node is re-created with a new virtual machine having a same name as the given virtual machine;
a server non-pingable state wherein the given processing node is unavailable while the given virtual machine is destroyed and the new virtual machine is created;
a join cluster state wherein the new virtual machine hosting the given processing node joins the cluster;
a database instance startup state wherein the given instance of the database application is started on the new virtual machine hosting the given processing node;
an exit with failure state wherein the given processing node has failed to complete one or more of the database instance shutdown state, the leave cluster state, the reclone state, the server non-pingable state, the join cluster state, and the database instance startup state; and
an exit with success state wherein the given processing node has successfully completed the database instance startup state.

11. The method of claim 1 wherein the cluster comprises a storage system cluster.

12. The method of claim 11 wherein the storage system cluster comprises a network file system cluster.

13. A computer program product comprising a non-transitory processor-readable storage medium having stored therein program code of one or more software programs, wherein the program code when executed by at least one processing device cause the at least one processing device:
to initiate a rolling cluster reboot for a cluster comprising a plurality of processing nodes;
to obtain encoded state information specifying a plurality of states for transitioning a given processing node of the cluster from running as part of the cluster to rebooting and back to running as part of the cluster, the encoded state information further specifying at least one timeout associated with a transition to a given one of the plurality of states;
to monitor transitioning of the given processing node between the plurality of states specified in the encoded state information;
to generate an alert responsive to determining that an elapsed time has exceed the at least one timeout specified in the encoded state information without the given processing node having transitioned to the given state;
to provide the alert to a given client device coupled to the cluster via at least one network; and
to repeat the monitoring, generating and providing while one or more other processing nodes in the cluster transition, in a sequence, between the plurality of states specified in the encoded state information as part of the rolling cluster reboot;
wherein monitoring the transitioning of the given processing node between the plurality of states specified in the encoded state information is performed by at least one other processing node in the cluster;
wherein the at least one other processing node in the cluster periodically requests the given processing node to report a current state of the plurality of states; and
wherein generating the alert is responsive to the at least one other processing node determining that an elapsed time for the current state of the plurality of states exceeds the at least one timeout.

14. The computer program product of claim 13 wherein the at least one timeout comprises an overall timeout for the given processing node to complete transitioning to an exit with success state in the plurality of states.

15. The computer program product of claim 13 wherein the at least one timeout comprises at least one per-transition timeout for the given processing node to complete transitioning from a first state to a second state in the plurality of states.

16. An apparatus comprising:
at least one processing device comprising a processor coupled to a memory;
the at least one processing device being configured:
to initiate a rolling cluster reboot for a cluster comprising a plurality of processing nodes;
to obtain encoded state information specifying a plurality of states for transitioning a given processing node of the cluster from running as part of the cluster to rebooting and back to running as part of the cluster, the encoded state information further specifying at least one timeout associated with a transition to a given one of the plurality of states;
to monitor transitioning of the given processing node between the plurality of states specified in the encoded state information;
to generate an alert responsive to determining that an elapsed time has exceed the at least one timeout specified in the encoded state information without the given processing node having transitioned to the given state;
to provide the alert to a given client device coupled to the cluster via at least one network; and
to repeat the monitoring, generating and providing while one or more other processing nodes in the cluster transition, in a sequence, between the plurality of states specified in the encoded state information as part of the rolling cluster reboot;
wherein monitoring the transitioning of the given processing node between the plurality of states specified in the encoded state information is performed by at least one other processing node in the cluster;
wherein the at least one other processing node in the cluster periodically requests the given processing node to report a current state of the plurality of states; and
wherein generating the alert is responsive to the at least one other processing node determining that an elapsed time for the current state of the plurality of states exceeds the at least one timeout.

17. The apparatus of claim 16 wherein the at least one timeout comprises an overall timeout for the given processing node to complete transitioning to an exit with success state in the plurality of states.

18. The apparatus of claim 16 wherein the at least one timeout comprises at least one per-transition timeout for the given processing node to complete transitioning from a first state to a second state in the plurality of states.

19. The apparatus of claim 16 wherein the at least one processing device is further configured to determine an ordering for rebooting the processing nodes of the cluster by sorting the processing nodes of the cluster lexically by hostname, and wherein the sequence for rebooting the processing nodes in the rolling cluster reboot is based on the determined ordering.

20. The apparatus of claim 16 wherein the encoded state information comprises a plurality of entries each specifying:
 a starting state;
 a transition script for executing a transition from the starting state to a success end state;
 a transition timeout;
 the success end state; and
 a failure end state entered responsive to failure to transition to the success end state within the transition timeout.

* * * * *

UNITED STATES PATENT AND TRADEMARK OFFICE
CERTIFICATE OF CORRECTION

| | | |
|---|---|---|
| PATENT NO. | : 10,379,985 B1 | Page 1 of 1 |
| APPLICATION NO. | : 15/886518 | |
| DATED | : August 13, 2019 | |
| INVENTOR(S) | : William C. White et al. | |

It is certified that error appears in the above-identified patent and that said Letters Patent is hereby corrected as shown below:

On the Title Page

Item (73), Assignee line, please delete "EMC IP Holding Company LLC, Hopkinton, MA" and insert -- Dell Products L.P., Round Rock, TX --

Signed and Sealed this
Seventeenth Day of March, 2020

Andrei Iancu
*Director of the United States Patent and Trademark Office*